(12) United States Patent
Ban

(10) Patent No.: US 12,056,406 B2
(45) Date of Patent: Aug. 6, 2024

(54) NON-TRANSITORY COMPUTER-READABLE RECORDING MEDIUM STORING COMPUTER-READABLE INSTRUCTIONS FOR TERMINAL DEVICE FOR CAUSING LABEL PRINTER TO PRINT LABEL IMAGE, TERMINAL DEVICE FOR CAUSING LABEL PRINTER TO PRINT LABEL IMAGE, AND METHOD EXECUTED BY TERMINAL DEVICE FOR CAUSING LABEL PRINTER TO PRINT LABEL IMAGE

(71) Applicant: BROTHER KOGYO KABUSHIKI KAISHA, Nagoya (JP)

(72) Inventor: Ryoji Ban, Ama (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/185,758

(22) Filed: Mar. 17, 2023

(65) Prior Publication Data
US 2023/0297303 A1    Sep. 21, 2023

(30) Foreign Application Priority Data
Mar. 18, 2022    (JP) .................................. 2022-044586

(51) Int. Cl.
*G06F 3/12*    (2006.01)

(52) U.S. Cl.
CPC .......... *G06F 3/1243* (2013.01); *G06F 3/1205* (2013.01); *G06F 3/1232* (2013.01); *G06F 3/1255* (2013.01); *G06F 3/1286* (2013.01); *G06F 3/1292* (2013.01)

(58) Field of Classification Search
None
See application file for complete search history.

(56) References Cited

U.S. PATENT DOCUMENTS

2004/0078759 A1    4/2004  Ohashi et al.

FOREIGN PATENT DOCUMENTS

| EP | 2703999 A1 * | 3/2014 | .......... G06F 3/1205 |
| JP | 2004-118353 A | 4/2004 | |
| JP | 2006-272725 A | 10/2006 | |
| JP | 2020-161990 A | 10/2020 | |
| WO | WO-2015015006 A2 * | 2/2015 | .......... G06F 17/212 |

* cited by examiner

*Primary Examiner* — Thomas D Lee
(74) *Attorney, Agent, or Firm* — KENEALY VAIDYA LLP

(57) ABSTRACT

A terminal device may, in a case where a first template including a first object area exists and a predetermined instruction is given on the first object area, store first instruction information in a memory; in a case where a second template including a second object area exists and the predetermined instruction is given on the second object area, store second instruction information in the memory. The terminal device may, in a case where a print instruction is acquired under a state where the first and second instruction information are stored in the memory, create first print data by using a first template including the first object area indicated by the first instruction information and create second print data by using a second template including the second object area indicated by the second instruction information. The terminal device may send the first and second print data to the label printer.

10 Claims, 7 Drawing Sheets

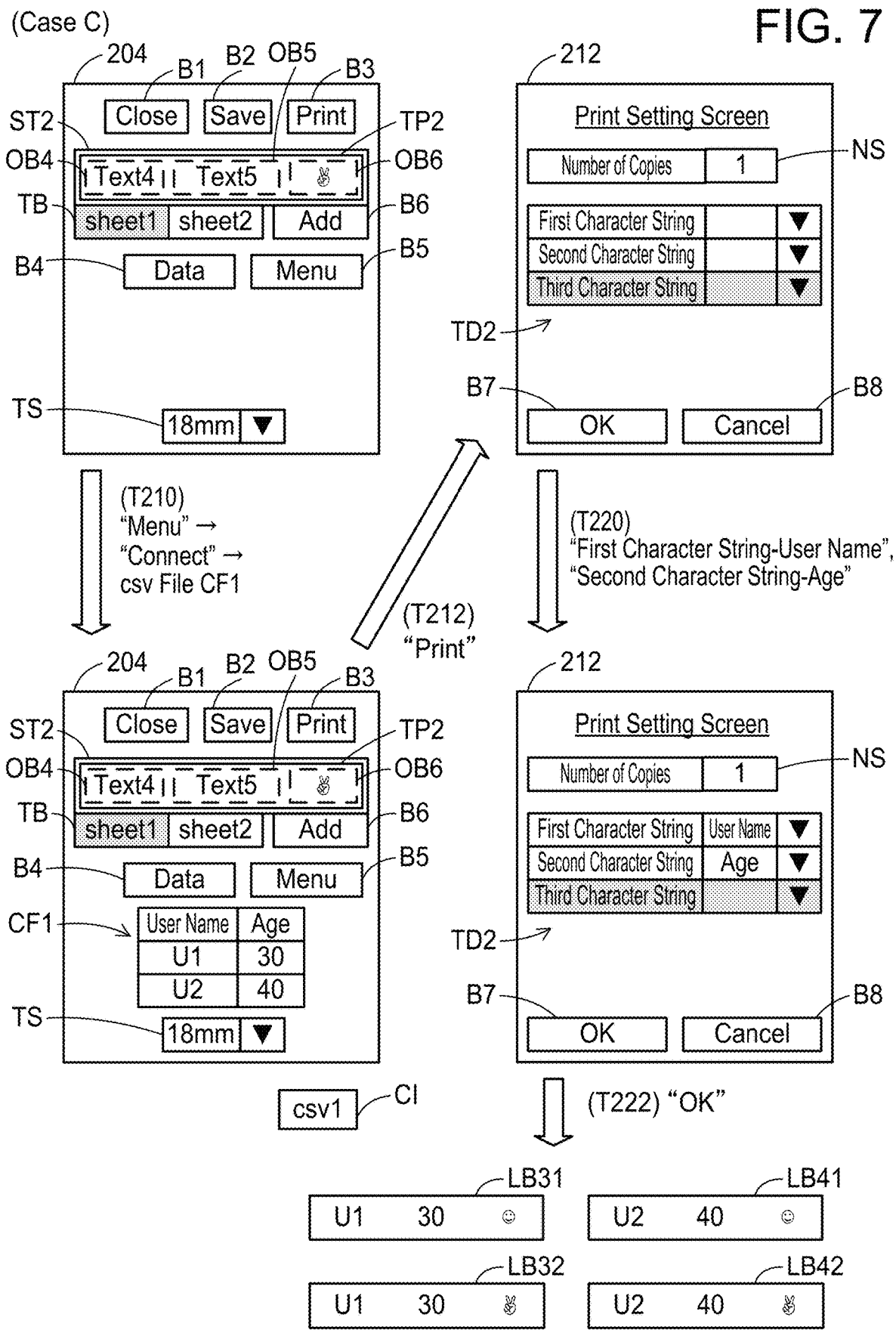

NON-TRANSITORY COMPUTER-READABLE RECORDING MEDIUM STORING COMPUTER-READABLE INSTRUCTIONS FOR TERMINAL DEVICE FOR CAUSING LABEL PRINTER TO PRINT LABEL IMAGE, TERMINAL DEVICE FOR CAUSING LABEL PRINTER TO PRINT LABEL IMAGE, AND METHOD EXECUTED BY TERMINAL DEVICE FOR CAUSING LABEL PRINTER TO PRINT LABEL IMAGE

REFERENCE TO RELATED APPLICATIONS

This application claims priority from Japanese Patent Application No. 2022-044586 filed on Mar. 18, 2022. The entire content of the priority application is incorporated herein by reference.

BACKGROUND ART

A system including a printing device and a mobile information terminal is known. The mobile information terminal sends a layout template which was obtained from a server to the printing device. When selection of a certain layout template from among template catalog data is accepted, the mobile information terminal acquires the certain layout template and sends information indicating that the certain layout template has been selected to the printing device. When inputting of character information to a character inputting area of the certain layout template is accepted, the mobile information terminal sends the inputted character information to the printing device. When the information indicating that the certain layout template has been selected and the character information are received from the mobile information terminal, the printing device prints an image in which the inputted character information is written in the character inputting area of the certain layout template.

DESCRIPTION

The present teachings provide an art configured to improve user convenience.

The disclosure herein discloses a non-transitory computer-readable recording medium storing computer-readable instructions for a terminal device. The terminal device may comprise a processor; and a memory. The computer-readable instructions, when executed by the processor, cause the terminal device to: in a case where a first template including a first object area exists and a predetermined instruction is given on the first object area, store first instruction information which indicates that the predetermined instruction has been given on the first object area in the memory; in a case where a second template including a second object area exists and the predetermined instruction is given on the second object area, store second instruction information which indicates that the predetermined instruction has been given on the second object area in the memory, the second template being different from the first template; in a case where a print instruction is acquired under a state where the first instruction information and the second instruction information are stored in the memory, create first print data by using the first template including the first object area indicated by the first instruction information, wherein the first print data is for causing a label printer to create a single label, and the first print data represents a first print label image in which a first text designated by a user is written in the first object area; in the case where the print instruction is acquired under the state where the first instruction information and the second instruction information are stored in the memory, create second print data by using the second template including the second object area indicated by the second instruction information, wherein the second print data is for causing the label printer to create a single label, and the second print data represents a second print label image in which the first text is written in the second object area; and send the first print data and the second print data to the label printer According to the above configuration, in the case where the printing instruction is acquired in the state where the first instruction information and the second instruction information are stored in the memory, the terminal device sends the first print data indicating the first print label image in which the first text is written in the first object area and the second print data indicating the second print label image in which the first text is written in the second object area to the label printer. Due to this, a user is able to cause the label printer to print the first and second print label images each including the same first text. Accordingly, user convenience can be improved.

Above computer-readable instructions, a terminal device implemented by the computer-readable instructions for the above-described terminal device and a method executed by the above terminal device are also novel and useful. A communication system comprising the above terminal device and the label printer is also novel and useful.

FIG. 7 illustrates a sequence diagram of Case C in which a label image including a text in a csv file is printed.

Figure 1:
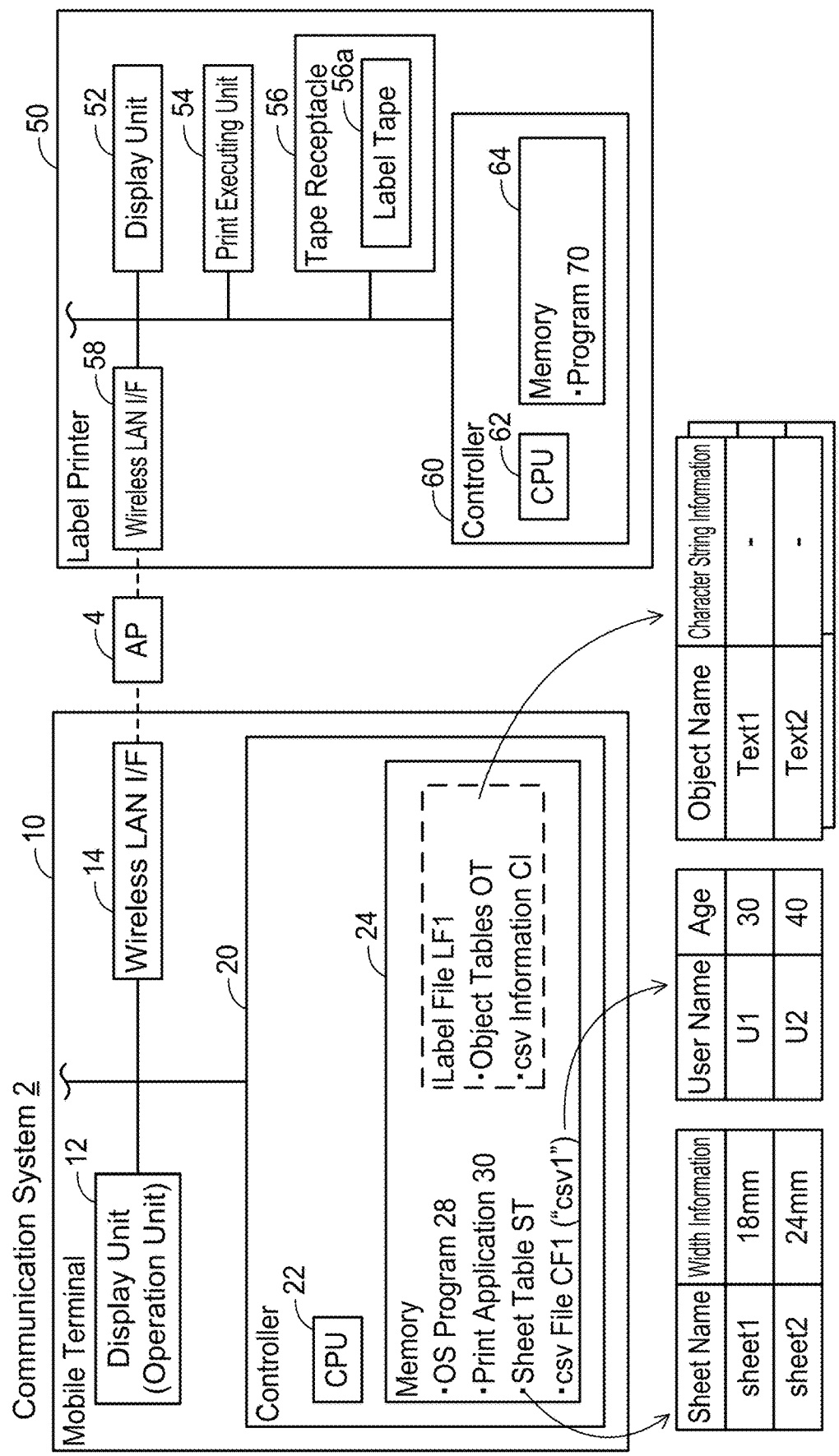
FIG. 1 illustrates a configuration of a communication system.
Figure 2:
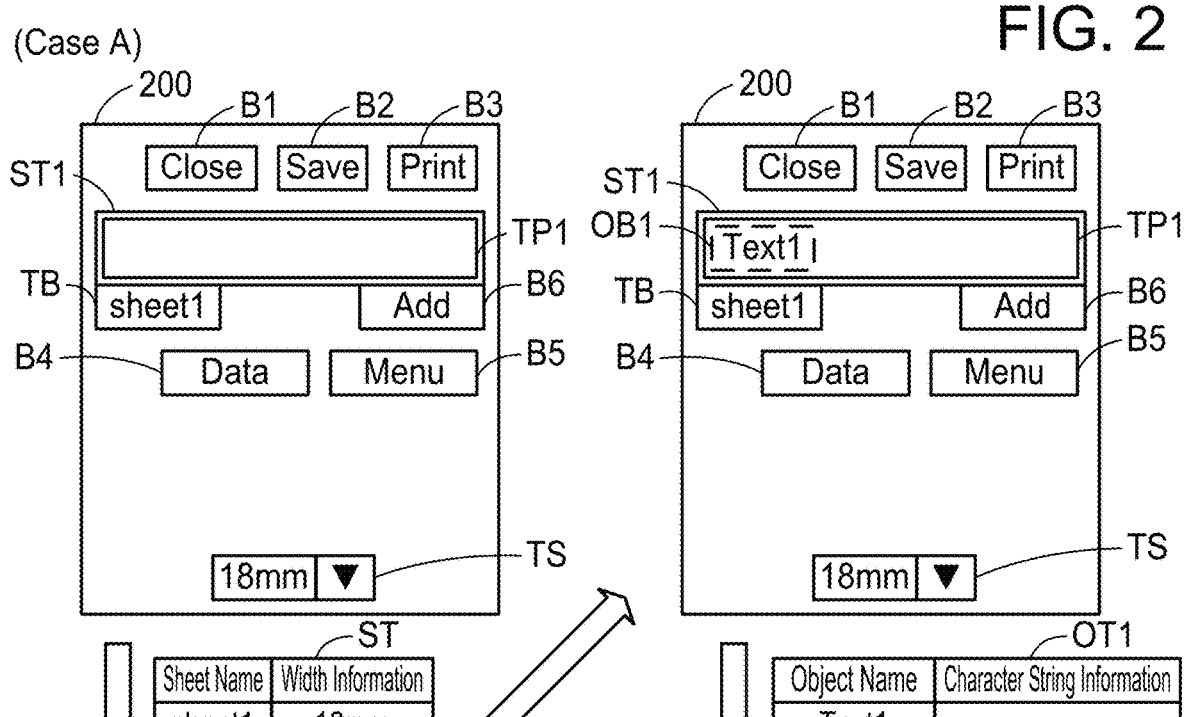
FIG. 2 illustrates a sequence diagram of Case A in which a label image including a text designated by a user is printed.
Figure 2:
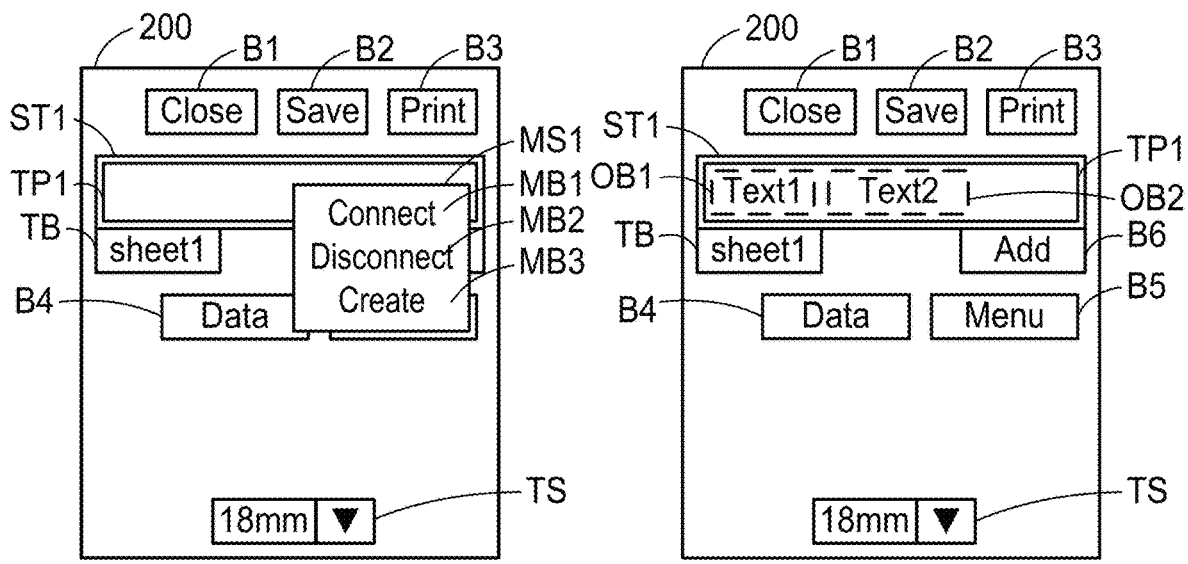
Figure 2:
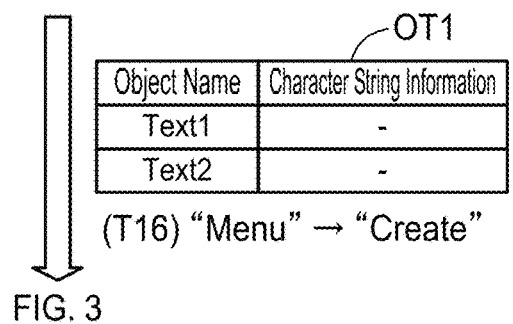

EMBODIMENT (Configuration of Communication System 2; FIG. 1)

As shown in FIG. 1, a communication system 2 comprises a mobile terminal 10 and a label printer 50. The mobile terminal 10 and the label printer 50 have wireless connection established with an Access Point (AP) 4. The mobile terminal 10 and the label printer 50 are configured to communicate with each other via the AP 4.

In the present embodiment, it is realized that a user creates a label attachable to an object to be managed by using the mobile terminal 10 and the label printer 50. The label is created by the label printer 50 printing a label image on an adhesive sticker. The mobile terminal 10 creates print data representative of a label image, and sends the created print data to the label printer 50.

(Configuration of Mobile Terminal 10)

The mobile terminal 10 is a mobile terminal device such as a mobile phone, a smartphone, a PDA, a laptop PC, and a tablet PC. The mobile terminal 10 comprises a display unit 12, a wireless LAN interface (hereafter, interface will be referred to as "I/F") 14, and a controller 20.

The display unit 12 is a display for displaying various information. The display unit 12 functions also as a so-called touch screen. Thus, the user can input various kinds of instructions to the mobile terminal 10 by operating a plurality of keys displayed on the display unit 12. That is, the display unit 12 functions as an operation unit also.

The wireless LAN I/F 14 is an I/F configured to execute Wi-Fi communication in accordance with Wi-Fi scheme, and has wireless connection established with the AP 4. The Wi-Fi scheme is a wireless communication scheme of 802.11 standards by the Institute of Electrical and Electronics Engineers, Inc. (IEEE) and its subordinate standards (e.g., 802.11a, 11b, 11g, 11n, 11 ac). "Wi-Fi" is a registered trademark of the Wi-Fi Alliance.

The controller 20 comprises a CPU 22 and a memory 24. The memory 24 may be composed of a volatile memory, and/or a non-volatile memory, for example. The CPU 22 is configured to execute various processes in accordance with an operating system (OS) program 28, a print application 30 that are stored in the memory 24. The OS program 28 is a program for controlling various kinds of basic operations of the mobile terminal 10. The print application 30 is an application provided by a vendor of the label printer 50, and is installed on the mobile terminal 10 from a server on the Internet. The print application 30 is an application for causing the label printer 50 to print or the like by using the mobile terminal 10. Hereafter, the application will be referred to as "app".

The memory 24 further stores a sheet table ST and a csv file CF1. In the sheet table ST, a sheet name and width information are stored in association with each other. The sheet name is a name of a sheet on which a template including a label image to be printed (i.e., of print target) is displayed. The width information is information indicating a width of a label tape on which the label image is to be printed. Csv files are each a text file in which plural texts are set off by commas. In FIG. 1, plural texts written in the csv file CF1 are indicated in table format. Field names are written in a first row of the csv file CF1 (i.e., uppermost row). In the csv file CF1, texts corresponding to the field name "User Name" and texts corresponding to a field name "Age" are respectively aligned in a column direction (vertical direction). The csv file CF1 includes four texts "U1", "U2", "30", and "40".

The memory 24 may further store a label file LF1 including a template for creating print data representing a label image. A plurality of object tables OT and the csv information CI may be written in the label file LF1. In each object table OT, an object name and character string information are associated with each other. The object names are each information for identifying an object part which will be described later. The character string information is information for designating a text to be written in the object part corresponding to the object name associated with that character string information. The csv information CI is information indicating a csv file associated with the label file LF1.

(Configuration of Label Printer 50)

The label printer 50 comprises a display unit 52, a print executing unit 54, a tape receptacle 56, a wireless LAN I/F 58, and a controller 60.

The display unit 52 is a display for displaying various kinds of information. The tape receptacle 56 is configured to receive a label cassette (not shown) housing a label tape 56a. In the present embodiment, a label cassette housing a label tape having a width of 18 mm, or housing a label tape having a width of 24 mm can be attached to the tape receptacle 56. The print executing unit 54 is of a so-called thermal transfer printing mechanism, and configured to create a label by copying a label image on the label tape 56a. In a modification, the print executing unit 54 may be of another printing mechanism such as an ink-jet scheme, a laser scheme. The wireless LAN I/F 58 is similar to the wireless LAN I/F 14 mentioned above.

The controller 60 comprises a CPU 62 and a memory 64. The CPU 62 is configured to execute various processes in accordance with a program 70 stored in the memory 64. The memory 64 may be composed of a volatile memory and/or a nonvolatile memory, for example.

(Specific Cases; FIGS. 2 to 7)

With reference to FIGS. 2 to 7, specific cases A to C implemented by the communication system 2 according to the present embodiment will be described. Hereafter, for easier understanding, operations executed by each of the CPU 22 of the mobile terminal 10 and the CPU 62 of the label printer 50 are described with each of the mobile terminal 10 and the label printer 50 as a subject of action, without the CPU 22, 62 being described as the subject of action. Also, respective types of communication executed between the mobile terminal 10 and the label printer 50 are executed via the wireless LAN I/F 14, 58 or the AP 4. Due to this, hereafter, the recitations of "via the wireless LAN 14, 58" and "via the AP 4" may be omitted.

(Case A; FIGS. 2 to 5)

With reference to FIGS. 2 to 5, Case A in which two labels LB11, LB12 (see FIG. 5) including a text inputted by the user are printed will be described. In an initial state of Case A, in the sheet table ST, the sheet name "sheet1" and the width information "18 mm" are stored in association with each other. Further, the label file LF1 is stored in the memory 24. The csv information CI of the label file LF1 is in blank state, which means that the label file LF1 does not store any object table OT. Also, the label tape 56a having the width "18 mm" is mounted in the tape receptacle 56 of the label printer 50.

The mobile terminal 10 is configured to execute the following processes in accordance with the print app 30 when an application activation operation for activating the print app 30 is accepted. Firstly, when an operation for opening the label file LF1 is accepted, the mobile terminal 10 displays a first top screen 200 on the display unit 12. The first top screen 200 includes a Close button B1, a Save button B2, a Print button B3, a Data button B4, a Menu button B5, an Add button B6, a first sheet ST1, a sheet tab TB, and a tape width selection section TS. The Close button B1 is for finishing the print app 30. The Save button B2 is for saving the label file LF1. The Print button B3 is for executing a label printing process. The Data button B4 is for displaying a screen for associating an object area and a field name. The Menu button B5 is for displaying plural menus. The Add button B6 is for adding a sheet. The first sheet ST1 includes a first template TP1. The first template TP1 is an area representing a label image to be printed by the label printer 50. The tape width selection section TS is a section for selecting the width of the label tape on which the label image is to be printed (i.e., 18 mm, 24 mm). Since the sheet name "sheet1" of the first sheet ST1 and the width information "18 mm" are associated with each other in the object table OT1, the first template TP1 included in the first sheet ST1 and the width information "18 mm" are accordingly associated with each other.

The mobile terminal 10 displays a menu screen MS on the first top screen 200 when selection of the Menu button B5 is accepted in T10. The menu screen MS includes a Connect button MB1, a Disconnect button MB2, and a Create button MB3. The Connect button MB1 is for opening a csv file and associating this csv file and the label file LF1. The Disconnect button MB2 is for disassociating an association between the csv file and the label file LF1. The Create button MB3 is for creating an object area. The object area is an area in which print target(s) such as text(s), symbol(s), and/or photo(s) are to be disposed.

The mobile terminal 10 receives selection of the Create button MB3 in T12. Then the mobile terminal 10 displays an object part OB1 in the first template TP1 of the first top screen 200 when an area in which the new object part OB1 is to be disposed is designated and an input of an object name "Text1" of the new object part OB1 is accepted. Although the object name "Text1" is displayed in the object part OB1 in the present embodiment, a text different from the object name may be displayed in the object part OB1. The mobile terminal 10 creates the object table OT1 corresponding to the first sheet ST1 and stores the object name "Text1" in the object table OT1. At this timing, the object name "Text1" has no field name associated therewith in the object table OT1.

The mobile terminal 10 accepts selection of the Menu button B5 and receives selection of the Create button MB3 in T14. Then, the mobile terminal 10 displays an object part OB2 in first template TP1 of the first top screen 200 when an area in which the new object part OB2 is to be disposed is designated and an input of the object name "Text2" of the new object part OB2 is received. The mobile terminal 10 stores the object name "Text 2" in the object table OT1. At this timing, the character string information with which each of the object names "Text 1" and "Text 2" is associated is blank in the object table OT1.

Figure 3:
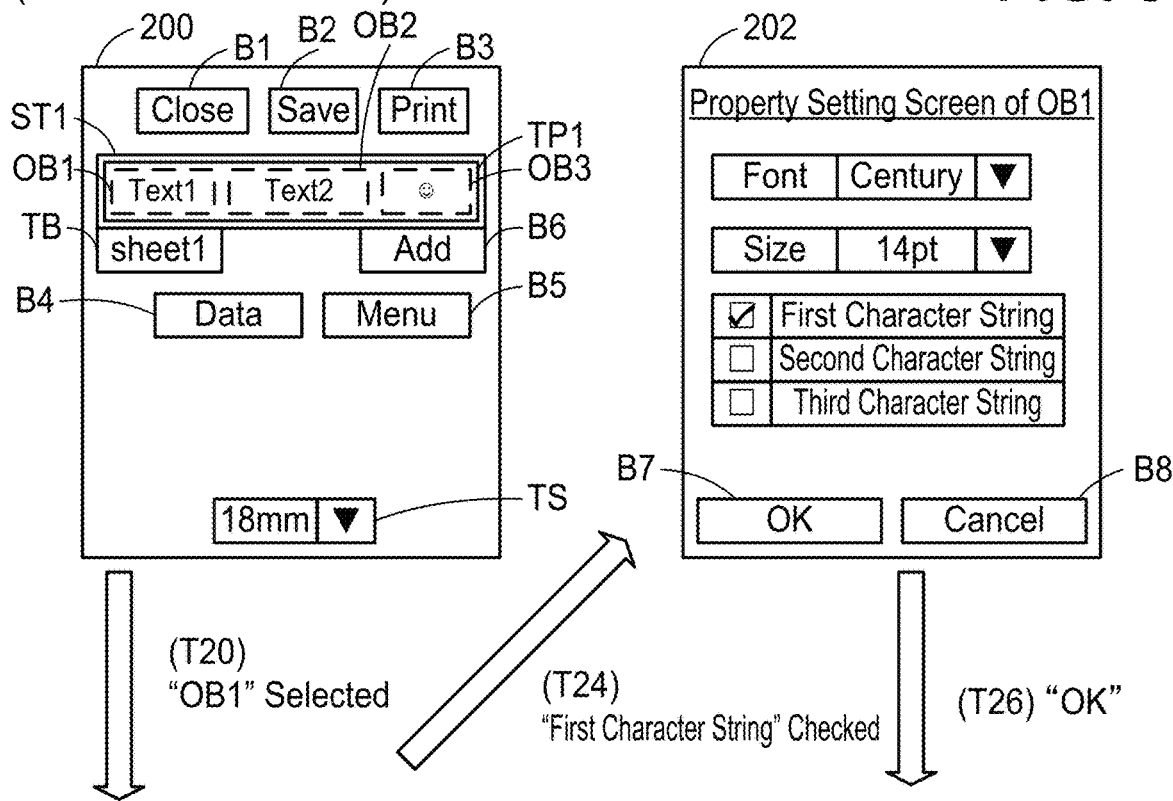
FIG. 3 illustrates a sequence diagram of continuation of FIG. 2.
Figure 3:
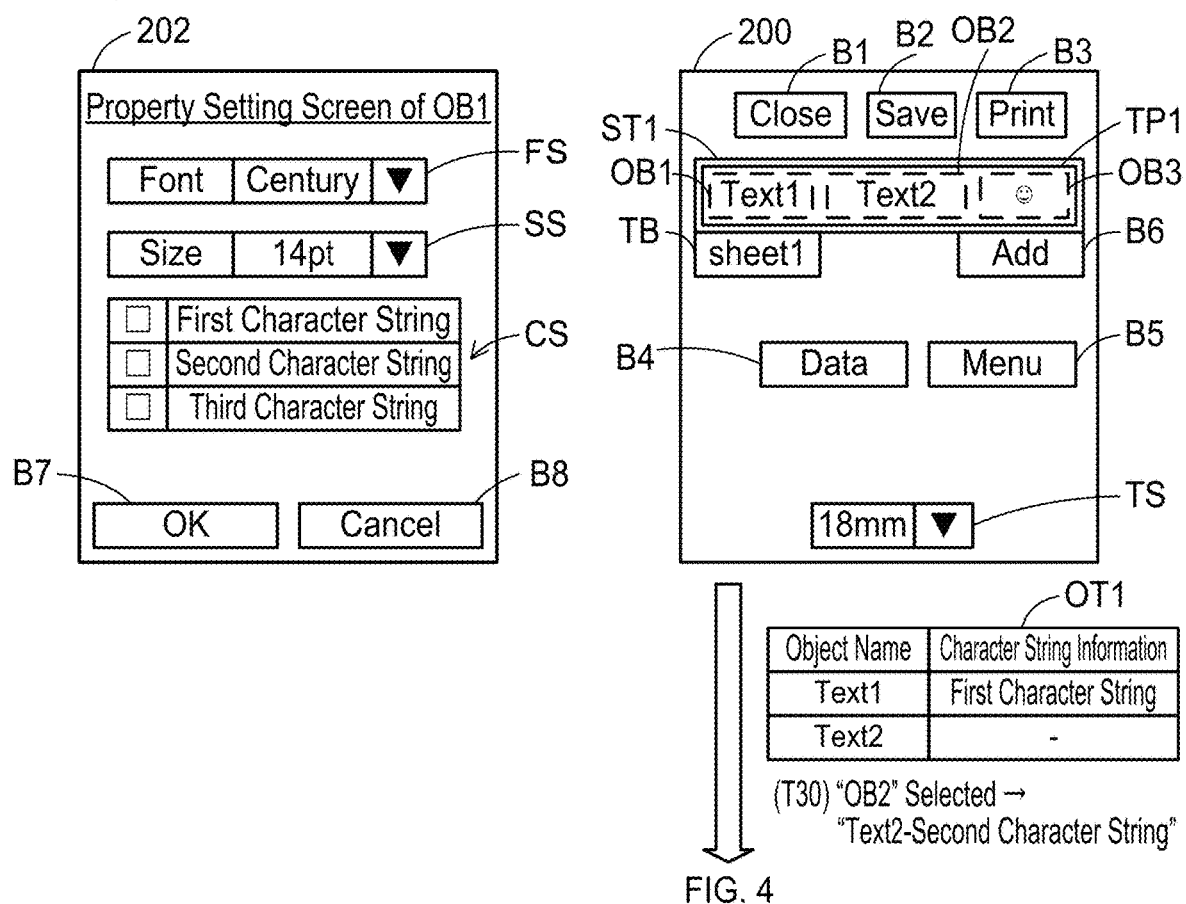

The mobile terminal 10 accepts selection of the Menu button B5 and accepts selection of the Create button MB3 in T16. When an area in which a new object part OB3 is to be disposed is designated and selection of symbol "Smile Mark" for the new object part OB3 has been accepted, the mobile terminal 10 displays the object part OB3 in the first template TP1 of the first top screen 200 as shown in FIG. 3.

Figure 4:
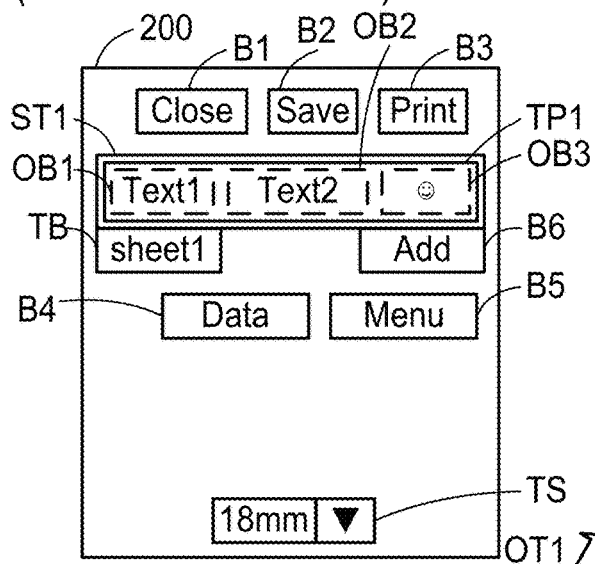
FIG. 4 illustrates a sequence diagram of continuation of FIG. 3.
Figure 4:
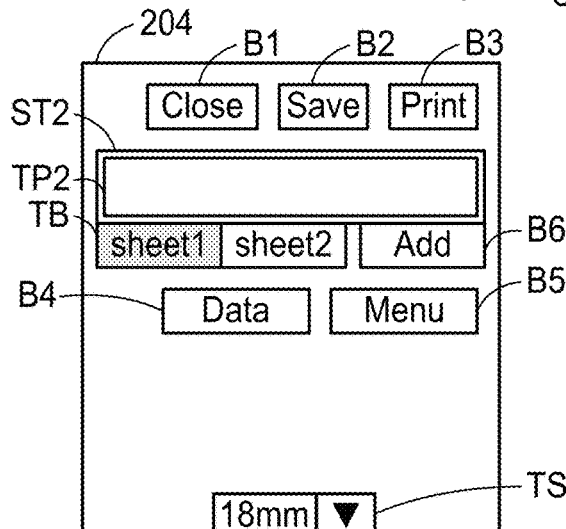
Figure 4:
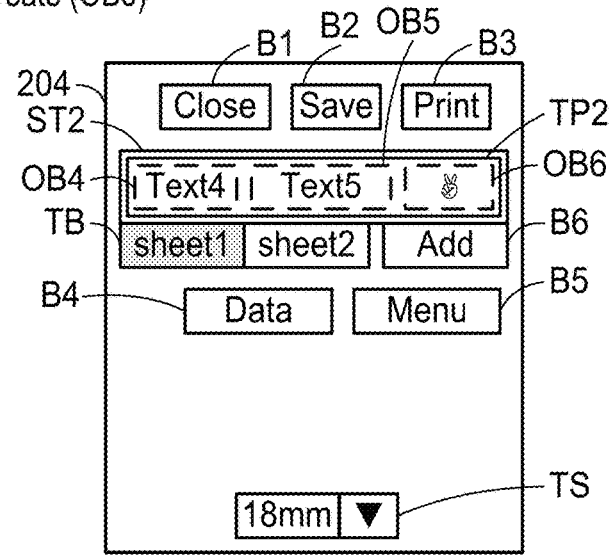

The mobile terminal 10 displays a property setting screen 202 on the display unit 12 when selection of the object part OB1 within the first template TP1 is accepted in T20. The property setting screen 202 is a screen for setting a property of the object part OB1. The property setting screen 202 includes a font setting section FS, a font size setting section SS, a character string information selection section CS, an OK button B7, and a Cancel button B8. The font setting section FS is for selecting the font of the text displayed on the object part OB1. The font size setting section SS is for selecting the size of the text displayed on the object part OB1. The character string information selection section CS is for associating the character string information to be associated with the object part OB1. The character string information selection section CS includes "first character string", "second character string", and "third character string" and check boxes respectively corresponding to "first character string", "second character string", and "third character string". The mobile terminal 10 displays the first top screen 200 on the display unit 12 when check on the check box corresponding to the "first character string" is accepted in T24 acceptance of the OK button B7 is accepted in T26. Also, the mobile terminal 10 determines that a first association instruction for associating the character string information "first character string" and the object part OB1 with each other has been acquired, and stores the character string information "first character string" in association with the object name "Text1" of the object part OB1 in the object table OT1. Next, the mobile terminal 10 accepts selection of the object part OB2 within the first template TP1 in T30. In this case, a property setting screen (not shown) corresponding to the object part OB2 is displayed on the display unit 12. The mobile terminal 10 further accepts check on the check box corresponding to "second character string" and accepts the selection of the OK button in T30. In this case, the mobile terminal 10 displays the first top screen 200 on the display unit 12 as shown in FIG. 4. Further, the mobile terminal 10 determines that a second association instruction for associating the character string information "second character string" and the object part OB2 has been acquired, and stores the character string information "second character string" in association with the object name "Text2" of the object part OB2 in the object table OT1.

The mobile terminal 10 displays a second top screen 204 including a second sheet ST2 on the display unit 12 when selection of the Add button B6 is accepted in T40. The second sheet ST2 includes a second template TP2. The second top screen 204 is the same as the first top screen 200 in top-left corner of FIG. 2 except that the second top screen 204 includes the second sheet ST2 and the sheet tab TB includes two tabs. The mobile terminal 10 also stores the sheet name "sheet2" of the second sheet ST2 and the width information "18 mm" in association with each other in the sheet table ST. Hereafter, the tab corresponding to the sheet currently selected is indicated without shading, and the tab corresponding to the sheet not currently selected is indicated with shading. Hereafter, description about selection of the Menu button B5 and selection of the Create button MB3 (see FIG. 2) when creating a new object part may be omitted.

The mobile terminal 10 displays an object part OB4 in the second template TP2 of the second top screen 204 when an area in which the new object part OB4 is to be disposed has been designated and an input of the object name "Text4" of the new object part OB4 has been accepted in T42. In this case, the mobile terminal 10 creates an object table OT2 corresponding to the second sheet ST2 and stores the object name "Text4" in the object table OT1. Also, the mobile terminal 10 further displays an object part OB5 in the second template TP2 of the second top screen 204 when an area in which the new object part OB5 is to be disposed has been designated and an input of the object name "Text5" of the new object part OB5 has been accepted in T42. The mobile terminal 10 stores the object name "Text5" in the object table OT2. The mobile terminal 10 further displays a new object part OB6 in the second template TP2 of the second top screen 204 when an area in which the object part OB6 is to be disposed has been designated and selection of symbol "Peace Sign" has been accepted.

The mobile terminal 10 accepts selection of the object part OB4 in the second template TP2, accepts the check on the checkbox corresponding to "first character string" in the property setting screen (not shown) corresponding to the object part OB4, and accepts selection of the OK button in T44. In this case, the mobile terminal 10 determines that a third association instruction for associating the character string information "first character string" and the object part OB4 with each other has been acquired, and stores the character string information "first character string" in association with the object name "Text4" in the object table OT2. The mobile terminal 10 further accepts selection of the object part OB5 in the second template TP2, accepts check on the check box corresponding to "second character string" in the property setting screen (not shown) corresponding to the object part OB5, and accepts the selection of the OK button in T46. In this case, the mobile terminal 10 determines that a fourth association instruction for associating the character string information "second character string" and the object part OB5 with each other has been acquired, and stores the character string information "second character string" in association with the object name "Text5" in the object table OT2.

Figure 5:
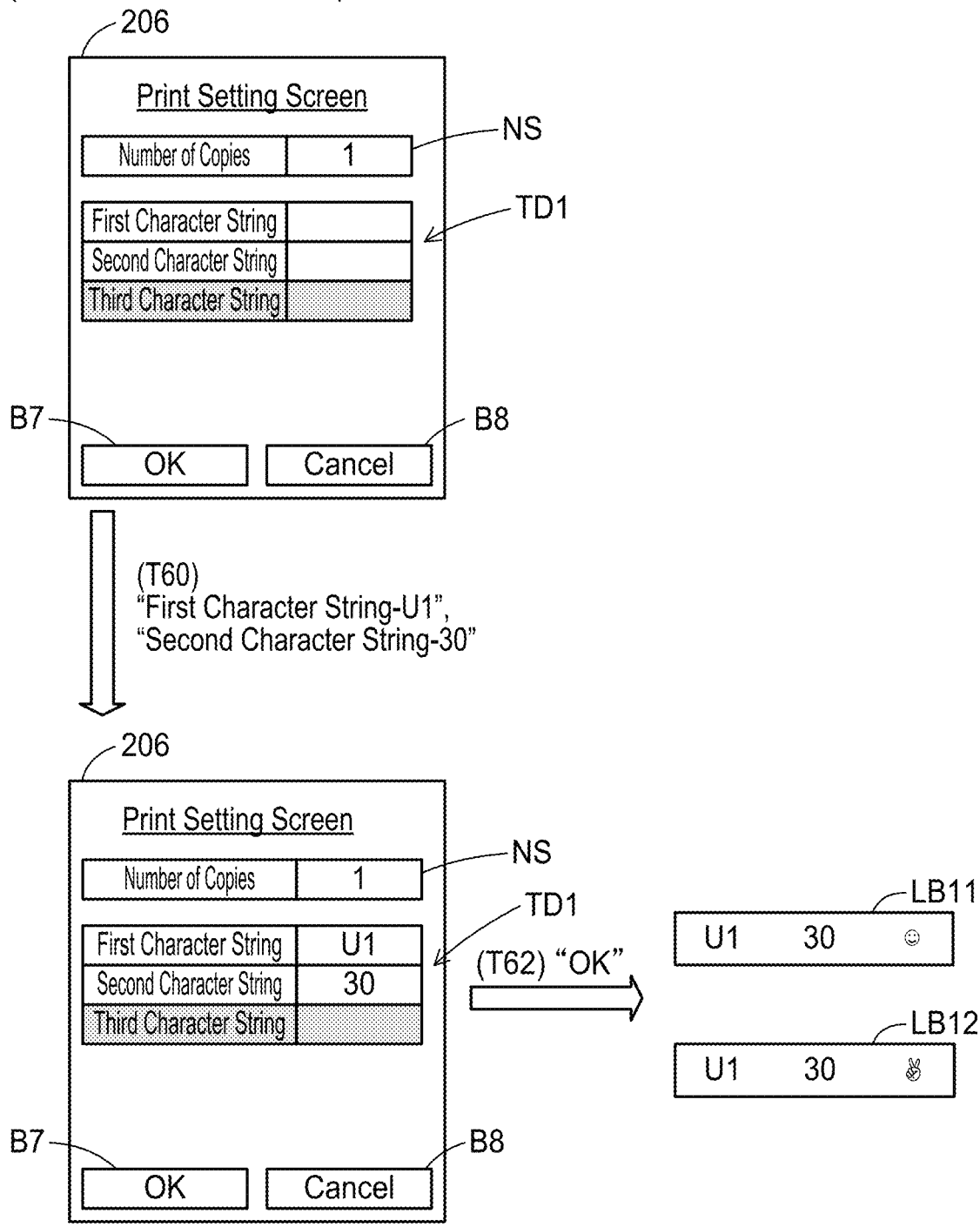
FIG. 5 illustrates a sequence diagram of continuation of FIG. 4.

When selection of the Print button B3 is accepted in T50, the mobile terminal 10 determines that a print instruction has been acquired and displays a first print setting screen 206 of FIG. 5 on the display unit 12. The first print setting screen 206 includes a number-of-copies selection section NS, a first text designation section TD1, an OK button B7, and a Cancel button B8. The first text designation section TD1 is for designating a text to be written in an object part. Here in the present embodiment, the mobile terminal 10 determines that the character string information "first character string", "second character string" are included in the object tables OT1, OT2, by which the mobile terminal 10 indicates inputting sections corresponding to the character string information "first character string", "second character string" without shading, and determines that the character string information "third character string" is not included in any of the object tables OT, by which the mobile terminal 10 indicates an inputting section corresponding to the character string information "third character string" with shading. Due to this, the user can acknowledge that there is no object part associated with the character string information "third character string". When the mobile terminal 10 accepts an input of "U1" into the inputting section corresponding to the character string information "first character string", and an input of "30" into the inputting section corresponding to the character string information "second character string" in T60, and accepts the selection of the OK button B7 in T62, the mobile terminal 10 sends, to the label printer 50, a request signal requesting for current width information indicating the width of the label tape 56a currently mounted in the label printer 50 to be sent.

When the request signal is received from the mobile terminal 10, the label printer 50 acquires the current width information "18 mm" indicating the width of the label tape 56a being currently mounted in the label printer 50, and sends the acquired current width information "18 mm" to the mobile terminal 10.

When the current width information "18 mm" is received from the label printer 50, the mobile terminal 10 specifies the width information "18 mm" associated with the sheet name "sheet1" of the first sheet ST1 which includes the first template TP1 in the sheet table ST. The mobile terminal 10 then determines that the width "18 mm" indicated by the specified width information and the width "18 mm" indicated by the current width information match, and uses the first template TP1 including the object parts OB1, OB2, OB3, thereby creating first print data for causing the label printer 50 to print one label. The mobile terminal 10 specifies that the character string information "first character string", "second character string" are associated with the object names "Text1", "Text2" in the object table OT1 (see FIG. 4). Next, the mobile terminal 10 determines that the texts "U1", "30" that were designated by the user in T60, T62 respectively correspond to the character string information "first character string", "second character string". In this case, the mobile terminal 10 specifies to write the text "U1" corresponding to the character string information "first character string" in the object part OB1 corresponding to the object name "Text1", and write the text "30" corresponding to the character string information "second character string" in the object part OB2 corresponding to the object name "Text2". The mobile terminal 10 then creates the first print data indicating a first print label image in which the text "U1" is written in the object part OB1, the text "30" is written in the object part OB2, and the symbol "Smile Mark" is disposed in the object part OB3. Further, the mobile terminal 10 specifies in the sheet table ST the width information "18 mm" associated with the sheet name "sheet2" of the second sheet ST2 including the second template TP2. The mobile terminal 10 then determines that the width "18 mm" indicated by the specified width information and the width "18 mm" indicated by the current width information match, and uses the second template TP2 including the object parts OB4, OB5, OB6, thereby creating second print data for causing the label printer 50 to create one label. The mobile terminal 10 then performs processes the same as those in the case of using the first template TP1 and specifies to write the text "U1" corresponding to the character string information "first character string" in the object part OB4 corresponding to the object name "Text4", and write the text "30" corresponding to the character string information "second character string" in the object part OB5 corresponding to the object name "Text5". The mobile terminal 10 then creates the second print data indicating a second print label image in which the text "U1" is written in the object part OB4, the text "30" is written in the object part OB5, and the symbol "Peace Sign" is disposed in the object part OB6. Subsequently, the mobile terminal 10 sends the first print data and the second print data to the label printer 50.

When the first print data and the second print data are received from the mobile terminal 10, the label printer 50 uses the first print data to print the label LB11 corresponding to the first print label image and uses the second print data to print the label LB12 corresponding to the second print label image. In the label LB11, the text "U1" is written in the object part OB1, the text "30" is written in the object part OB2, and the symbol "Smile Mark" is disposed in the object part OB3. In the label LB12, the text "U1" is written in the object part OB4, the text "30" is written in the object part OB5, and the symbol "Peace Sign" is disposed in the object part OB6. That is, the labels LB11, LB12 include the same texts "U1", "30".

(Effects of Case A)

As indicated in Case A, the first template TP1 (see FIG. 3) includes the object part OB1 (see FIG. 3) and the object part OB2 (see FIG. 3), and the second template TP2 (see FIG. 4) includes the object part OB4 (see FIG. 4) and the object part OB5. The mobile terminal 10 creates the first print data and the second print data when the selection of the Print button B3 is accepted in the state where the object names "Text1", "Text2" are respectively associated with the character string information "first character string", "second character string" in the object table OT1, and the object names "Text4", "Text5" are respectively associated with the character string information "first character string", "second character string" in the object table OT2. In the first print label image represented by the first print data, the text "U1" is written in the object part OB1 and the text "30" is written in the object part OB2. In the second print label image represented by the second print data, the text "U1" is written in the object part OB4 and the text "30" is written in the object part OB5. According to such configuration, the user is able to cause the label printer 50 to print the labels LB11, LB12 each including both of the two texts "U1", "30". Accordingly, user convenience can be improved.

As indicated in Case A, the user is able to input a text to be written in an object part in the first print setting screen 206. According to such configuration, the user is able to surely print a label including the text the user desires. Accordingly, user convenience can be improved.

Figure 6:
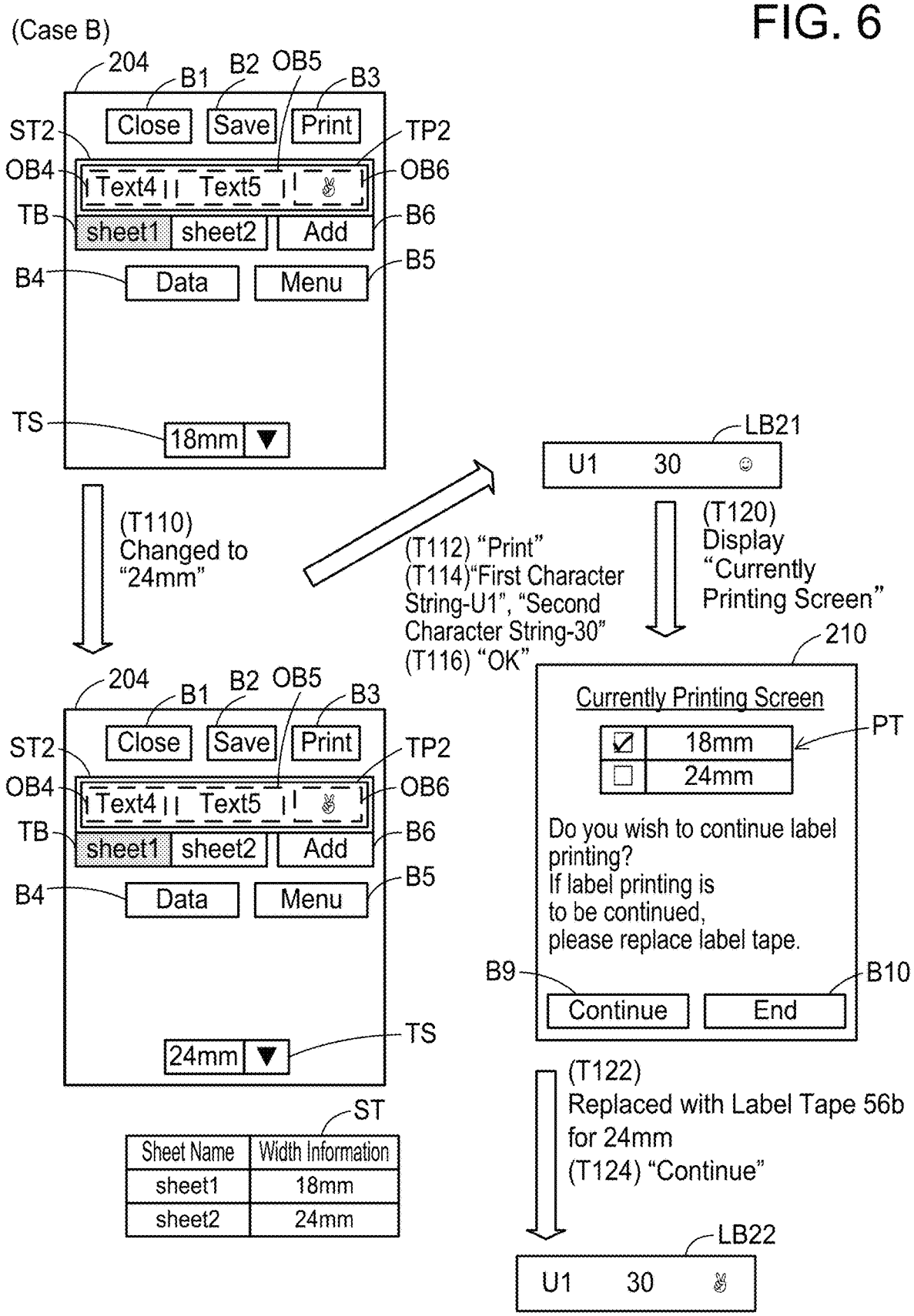
FIG. 6 illustrates a sequence diagram of Case B in which a label image including a text designated by the user is printed.

(Case B; FIG. 6)

With reference to FIG. 6, Case B in which labels LB21, LB22 with different widths are printed will be described. An initial state of Case B is a state after T46 of Case A (see FIG. 4). In other words, in the sheet table ST, the width information "18 mm", "18 mm" are stored in association with the sheet names "sheet1", "sheet2", respectively. Also in the object table OT1, the character string information "first character string", "second character string" are stored in association with the object names "Text1", "Text2", respectively. Further in the object table OT2, the character string information "first character string", "second character string" are stored in association with the object names "Text4", "Text5", respectively. The second top screen 204 in an upper-left corner of FIG. 6 is the same as the second top screen 204 in a lower-right corner of FIG. 4.

When an operation of changing "18 mm" within the tape width selection section TS to "24 mm" is accepted in T110, the mobile terminal 10 changes "18 mm" displayed in the tape width selection section TS to "24 mm". In addition, the mobile terminal 10 changes the width information "18 mm" associated with the sheet name "sheet2" of the second sheet ST2 currently selected to "24 mm" in the sheet table ST.

T112, T114, T116 are the same as T50 of FIGS. 4 and T60, T62 of FIG. 5, respectively. As with Case A, the mobile terminal 10 sends a request signal requesting for the current width information to be sent to the label printer 50, and receives the current width information "18 mm" from the label printer 50. The mobile terminal 10 then determines that the width "18 mm" indicated by the width information associated with the first template TP1 and the width "18 mm" indicated by the current width information match, and creates the first print data representing the first print label image in which the text "U1" is written in the object part OB1, the text "30" is written in the object part OB2, and the symbol "Smile Mark" is disposed in the object part OB3. Here also, the mobile terminal 10 determines that the width "24 mm" indicated by the width information associated with the second template TP2 and the width "18 mm" indicated by the current width information do not match, and does not create the second print data. In this case, the mobile terminal 10 sends the first print data only to the label printer 50.

When the first print data is received from the mobile terminal 10, the label printer 50 uses this first print data to print the label LB21 corresponding to the first print label image. The label LB21 is the same as the label LB11 in FIG. 5.

Next, the mobile terminal 10 determines that there is a template for which print data was not created (i.e., the second template TP2), and displays a currently-printing screen 210 on the display unit 12 in T120. The currently-printing screen 210 includes a print tape section PT, a Continue button B9, and an End button B10. The print tape section PT includes the width information "18 mm", "24 mm" and checkboxes respectively corresponding to the width information "18 mm", "24 mm". A checkbox in the print tape section PT being checked means that printing of the label with the width indicated by the width information corresponding to that checkbox has been completed. The user is able to acknowledge that the label with the width indicated by the width information corresponding to the checkbox unchecked ("24 mm" in the present case) is yet to be printed. In other words, the currently-printing screen 210 is a screen which notifies that print data was not created. The currently-printing screen 210 further includes a message which indicates that there is a need for replacing the label tape 56a mounted in the label printer 50 with a new one in case label printing is to be performed.

In T122, the label tape 56a mounted in the label printer 50 is replaced with a label tape 56b having the tape width "24 mm" by the user.

When selection of the Continue button B9 is accepted in T124, the mobile terminal 10 sends a request signal requesting for the current width information to be sent to the label printer 50, and receives the current width information "24 mm" from the label printer 50. The mobile terminal 10 then determines that the width "24 mm" indicated by the width information associated with the sheet name "sheet2" in the sheet table ST and the width "24 mm" indicated by the current width information match, and creates the second print data. The mobile terminal 10 creates the second print data representing the second print label image in which the text "U1" is written in the object part OB4, the text "30" is written in the object part OB5, and the symbol "Peace Sign" is disposed in the object part OB6.

When the second print data is received from the mobile terminal 10, the label printer 50 uses this second print data to print the label LB22 corresponding to the second print label image. The label LB22 is the same as the label LB12 in FIG. 5 except that the width of the LB22 is 24 mm.

(Effects of Case B)

As indicated in Case B, the mobile terminal 10 is configured to create print data in the case where the width indicated by the width information associated with the template and the width indicated by the current width information match, and configured not to create print data in the case where the width indicated by the width information associated with the template and the width indicated by the current width information do not match. If print data is created even when the width indicated by the width information associated with the template and the width indicated by the current width information do not match and the print data is sent to the label printer 50, an error occurs in the label printer 50. According to the above configuration, occurrence of errors in the label printer 50 can be suppressed. Accordingly, user convenience can be improved.

As indicated in Case B, the mobile terminal 10 is configured to display the currently-printing screen 210 notifying that the second print data was not created on the display unit 12 in the case where the second print data was not created after the selection of the Print button B3 has been accepted. According to the above configuration, the user is able to acknowledge that there is a template which was not used for printing. Thus, user convenience can be improved.

(Case C; FIG. 7)

With reference to FIG. 7, Case C in which labels LB31, LB32, LB41, and LB42 including texts in the csv file CF1 are printed will be described. An initial state of Case C is the same as the initial state of Case B of FIG. 6. A second top screen 204 in an upper-left corner of FIG. 7 is the same as the second top screen 204 in the upper-left corner of FIG. 6.

When selection of the Menu button B5 is accepted, selection of the Connect button MB1 (see FIG. 2) is accepted, and selection of the csv file CF1 is accepted in T210, the mobile terminal 10 displays the csv file CF1 on the second top screen 204 in table format. Also, the mobile terminal 10 determines that a coupling instruction for associating the label file LF1 and the csv file CF1 with each other and stores the file name "csvl" of the csv file CF1 in the csv information CI. Due to this, the label file LF1 and the csv file CF1 are associated with each other.

When selection of the Print button B3 is accepted in T212, the mobile terminal 10 determines that a print instruction has been acquired, and displays a second print setting screen 212 on the display unit 12. The second print setting screen 212 is the first print setting screen 206 in FIG. 5 except that a second text designation section TD2 is displayed instead of the first text designation section TD1. The second text designation section TD2 is different from the first text designation section TD1 in FIG. 5 in that the second text designation section TD2 has a pulldown button. The user is able to select the field names "User Name", "Age" within the csv file CF1 by operating the second text designation section TD2. Here, the user is able to directly input the field names "User Name", "Age" within the csv file CF1 into inputting sections of the second text designation section TD2, or able to directly input different texts than the field names "User Name", "Age" into the inputting sections of the second text designation section TD2. When an operation of selecting the field name "User Name" as the field name to be associated with the character string information "first character string" and selecting the field name "Age" as the field name to be associated with the character string information "second character string" is accepted in T220, the mobile terminal 10 displays "User Name" in a section corresponding to the character string information "first character string", and displays "Age" in a section corresponding to the character string information "second character string". When selection of the OK button B7 is accepted in T222, the mobile terminal 10 sends a request signal requesting the current width information to be sent to the label printer 50, and receives the current width information "18 mm" from the label printer 50.

The mobile terminal 10 determines that the width "18 mm" indicated by the width information corresponding to the first template TP1 and the width "18 mm" indicated by the current width information match, and creates two pieces of first print data by using the csv file CF1 and the first template TP1. The mobile terminal 10 specifies that the character string information "first character string" and "second character string" are associated with the object names "Text1" and "Text2" respectively in the object table OT1 (see FIG. 4). Next, the mobile terminal 10 determines that the field names "User Name" and "Age" that were designated by the user in T220, T222 respectively correspond to the character string information "first character string", "second character string". In this case, the mobile terminal 10 determines that the user has designated the two texts "U1", "U2" corresponding to the field name "User Name" of the csv file CF1 and the two texts "30", "40" corresponding to the field name "Age" of the csv file CF1. The mobile terminal 10 then creates the two pieces of first print data representing two first print label images in each of which the text corresponding to the field name "User Name" (i.e., "U1", "U2") is written in the object part OB1, the text corresponding to the field name "Age" (i.e., "30", "40") is written in the object part OB2, and the symbol "Smile Mark" is disposed in the object part OB3. The mobile terminal 10 also determines that the width "18 mm" indicated by the width information corresponding to the second template TP2 and the width "18 mm" indicated by the current width information match, and creates two pieces of second print data by using the csv file CF1 and the second template TP2. The mobile terminal 10 specifies that the character string information "first character string" and "second character string" are associated with the object names "Text1" and "Text2" respectively in the object table OT2 (see FIG. 4). The mobile terminal 10 then creates the two pieces of second print data representing two second print label images in each of which the text corresponding to the field name "User Name" (i.e., "U1", "U2") is written in the object part OB4, the text corresponding to the field name "Age" (i.e., "30", "40") is written in the object part OB5, and the symbol "Peace Sign" is disposed in the object part OB6. Subsequently, the mobile terminal 10 sends the two pieces of first print data and the two pieces of second print data to the label printer 50.

When the two pieces of first print data and the two pieces of second print data are received from the mobile terminal 10, the label printer 50 uses the two pieces of first print data to print the labels LB31, LB41 corresponding to the two first print label images and uses the two pieces of second print data to print the labels LB32, LB42 corresponding to the two second print label images. The labels LB31, LB32 are the same as the labels LB11, LB12 of FIG. 5. In the label LB41, the text "U2" is written in the object part OB1, the text "40" is written in the object part OB2, and the symbol "Smile Mark" is disposed in the object part OB3. In the label LB42, the text "U2" is written in the object part OB4, the text "40" is written in the object part OB5, and the symbol "Peace Sign" is disposed in the object part OB6. That is, the labels LB31, LB32 include the same texts "U1", "30", and the labels LB41, LB42 include the same texts "U2", "40". Here, the user may select a part of the csv file CF1 as a range to be printed. For example, the user may select only a second row in the csv file CF1 as the range to be printed. In this case, the labels LB31, LB32 including the texts "U1" and "30" written in the second row of the csv file CF1 are printed.

(Effects of Case C)

As indicated in Case C, the mobile terminal 10 creates the two pieces of first print data and the two pieces of second print data in the case where selection of the Print button B3 is accepted under the state where the object name "Text1" and the character string information "first character string" are associated with each other in the object table OT1, and the object name "Text4" and the character string information "first character string" are associated with each other in the object table OT2. In each of the two first print label images represented by the two pieces of first print data, a different text from among the two texts "U1", "U2" designated by the user is written in the object part OB1, and in each of the two second print label images represented by the two pieces of second print data, a different text from among the two texts "U1", "U2" designated by the user is written in the object part OB4. According to such configuration, the user can cause the label printer 50 to print four labels LB31, LB32, LB41, LB42 which includes one of the two texts "U1", "U2". Thus, user convenience can be improved.

As indicated in Case C, the two texts "U1", "U2" are included in the csv file CF1. According to such configuration, the user does not need to directly input the two texts when printing a label. Thus, user convenience can be improved.

(Effects of Present Embodiment)

According to the above configuration, the mobile terminal 10 sends the first print data representing the first print label image in which the text "U1" is written in the object part OB1 and the second print data representing the second print label image in which the text "U1" is written in the object part OB4 to the label printer 50 in the case where selection of the Print button B3 is accepted under the state where the object name "Text1" and the character string information "first character string" are associated with each other in the object table OT1 and the object name "Text4" and the character string information "first character string" are associated with each other in the object table OT2. Due to this, the user is able to cause the label printer 50 to print the first and second print label images including the same text "U1". Thus, user convenience can be improved.

(Correspondence Relationship)

The mobile terminal 10 is an example of "terminal device". The object part OB1 is an example of "first object area". The first association instruction and the third association instruction are an example of "predetermined instruction." The information indicating association between the object name "Text1" and the character string information "first character string" in the object table OT1 is an example of "first instruction information". The object part OB4 is an example of the "second object area". The information indicating association between the object name "Text4" and the character string information "first character string" in the object table OT2 is an example of "second instruction information". The text "U1" is an example of "first text". The width information associated with the sheet name "sheet1" and the width information associated with the sheet name "sheet2" in the object table OT1 are an example of "first width information" and "second width information". The currently-printing screen 210 in FIG. 6 is an example of "notification screen". The object part OB2 and the object part OB5 are an example of "third object area" and "fourth object area". The second association instruction and the fourth association instruction are an example of "second predetermined instruction". The information indicating the association between the object name "Text2" and the character string information "second character string" in the object table OT1 is an example of "third instruction information". The information indicating the association between the object name "Text5" and the character string information "second character string" in the object table OT2 is an example of "fourth instruction information". The text "30" is an example of "second text". The texts "U1", "U2" are an example of "M first texts". The csv file CF1 is an example of "database file". The first print setting screen 206 in FIG. 5 is an example of "inputting screen."

In one aspect, the process performed after T24, T26 of FIG. 3 is an example of process implemented by "store first instruction information". The process performed after T44 of FIG. 4 is an example of process implemented by "store second instruction information". The process performed after T50 of FIG. 4 is an example of process implemented by "create first print data", "create second print data", and "send the first print data and the second print data to the label printer". In another aspect, the process performed after T112 of FIG. 6 is an example of process implemented by "create first print data" and "send the first print data and the second print data to the label printer". The process performed after T124 of FIG. 6 is an example of process implemented by "create second print data" and "send the first print data and the second print data to the label printer". Further in another aspect, the process performed after T212 of FIG. 7 is an example of process implemented by "create first print data", "create second print data" and "send the first print data and the second print data to the label printer".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(First Modification) The mobile terminal 10 may not send the request signal for the current width information to be sent to the label printer 50. In the present Modification, the mobile terminal 10 creates the first print data and the second print data no matter what the width information is associated with each of the templates TP1, TP2 in the case where the Print button B3 is accepted under the state where the object name "Text1" and the character string information "first character string" are associated with each other in the object table OT1, and the object name "Text4" and the character string information "first character string" are associated with each other in the object table OT2. In the present Modification, "send a request signal", "receive the current width information" and "display a notification screen" may be omitted.

(Second Modification) In Case B of FIG. 6, the mobile terminal 10 may not display the currently-printing screen 210 on the display unit 12 in the case where the second print data has not been created. In another Modification, the mobile terminal 10 may notify that the second print data has not been created by sound instead of displaying the currently-printing screen 210 on the display unit 12. In these Modifications, "display a notification screen" may be omitted.

(Third Modification) The first template TP1 and the second template TP2 may be included in the same sheet. Also, in another Modification, each of the first template TP1 and the second template TP2 may be stored in a different label file. For example, the first template TP1 may be stored in the first label file, and the second template TP2 may be stored in the second label file. Then the first label file and the second label file simply need to be registered in a same folder.

(Fourth Modification) Each of the first template TP1 and the second template TP2 may be configured to be associated with only one text. In the present Modification, "store third instruction information" and "store fourth instruction information" may be omitted.

(Fifth Modification) An object part may be configured to be associated with only one text.

(Sixth Modification) "Database file" is not limited to a csv file, and only needs to be a file by which plural texts can be displayed in table format. For example, it may be an Excel file.

(Seventh Modification) The first print setting screen 206 in FIG. 5 may not include the first text designation section TD1. The mobile terminal 10 may display a screen for designating a text corresponding to the character string information "first character string" after T26 of FIG. 3 and the first top screen 200 and the second top screen 204 may include a button for displaying a screen for designating a text corresponding to the character string information "first character string". In the present Modification, "display an inputting screen" may be omitted.

(Eighth Modification) Although in each of the above embodiments, the respective processes in FIGS. 2 to 7 are implemented by software (i.e., the print app 30), at least one of these processes may be implemented by hardware such as a logic circuit.

What is claimed is:

1. A non-transitory computer-readable recording medium storing computer-readable instructions for a terminal device which comprises:
a processor; and
a memory,
wherein the computer-readable instructions, when executed by the processor, cause the terminal device to:
in a case where a first template including a first object area exists and a predetermined instruction is given on the first object area, store first instruction information which indicates that the predetermined instruction has been given on the first object area in the memory;
in a case where a second template including a second object area exists and the predetermined instruction is given on the second object area, store second instruction information which indicates that the predetermined instruction has been given on the second object area in the memory, the second template being different from the first template;
in a case where a print instruction is acquired under a state where the first instruction information and the second instruction information are stored in the memory, create first print data by using the first template including the first object area indicated by the first instruction information, wherein the first print data is for causing a label printer to create a single label, and the first print data represents a first print label image in which a first text designated by a user is written in the first object area;
in the case where the print instruction is acquired under the state where the first instruction information and the second instruction information are stored in the memory, create second print data by using the second template including the second object area indicated by the second instruction information, wherein the second print data is for causing the label printer to create a single label, and the second print data represents a second print label image in which the first text is written in the second object area; and
send the first print data and the second print data to the label printer.

2. The non-transitory computer-readable recording medium as in claim 1, wherein
the memory stores first width information indicating a width of a label tape of a print target in association with the first template, and stores second width information indicating a width of a label tape of a print target in association with the second template,
the computer-readable instructions, when executed by the processor, further cause the terminal device to:
in the case where the print instruction is acquired under the state where the first instruction information and the second instruction information are stored in the memory, send, to the label printer, a request signal for requesting the label printer to send current width information indicating a width of a label tape currently mounted in the label printer; and
in a case where the request signal is sent to the label printer, receive the current width information from the label printer,
wherein in a case where the width indicated by the first width information associated with the first template matches the width indicated by the current width information, the first print data is created,
in a case where the width indicated by the first width information does not match the width indicated by the current width information, the first print data is not created,
in a case where the width indicated by the second width information associated with the second template matches the width indicated by the current width information, the second print data is created, and
in a case where the width indicated by the second width information does not match the width indicated by the current width information, the second print data is not created.

3. The non-transitory computer-readable recording medium as in claim 2, wherein
the computer-readable instructions, when executed by the processor, further cause the terminal device to:
in a case where at least one of the first print data and the second print data is not created after the print instruction has been acquired, display a notification screen on a display unit of the terminal device, the notification screen being for notifying that the at least one print data has not been created.

4. The non-transitory computer-readable recording medium as in claim 1, wherein
the first template is included in a first sheet of a label file, and
the second template is included in a second sheet different from the first sheet of the label file.

5. The non-transitory computer-readable recording medium as in claim 1, wherein
the first template includes the first object area and a third object area different from the first object area, and
the second template includes the second object area and a fourth object area different from the second object area,
wherein the computer-readable instructions, when executed by the processor, further cause the terminal device to:
in a case where the first template exists and a second predetermined instruction is given on the third object area, store third instruction information which indicates that the second predetermined instruction has been given on the third object area in the memory; and
in a case where the second template exists and the second predetermined instruction is given on the fourth object area, store fourth instruction information which indicates that the second predetermined instruction has been given on the fourth object area in the memory,
wherein in a case where the print instruction is acquired under a state where the first instruction information, the second instruction information, the third instruction information, and the fourth instruction information are stored in the memory, the first text is written in the first object area and a second text designated by the user is written in the third object area in the first print label image, and
wherein in the case where the print instruction is acquired under the state where the first instruction information, the second instruction information, the third instruction information, and the fourth instruction information are stored in the memory, the first text is written in the second object area and the second text is written in the fourth object area in the second print label image.

6. The non-transitory computer-readable recording medium as in claim 1, wherein
in the case where the print instruction is acquired under the state where the first instruction information and the second instruction information are stored in the memory, M pieces (M being an integer of 2 or more) of the first print data for causing the label printer to create M labels are created by using the first template, in each of M first print label images represented by the M pieces of the first print data, a different first text among M first texts designated by the user is written in the first object area, in the case where the print instruction is acquired under the state where the first instruction information and the second instruction information are stored in the memory, M pieces of the second print data for causing the label printer to create M labels are created by using the second template, and in each of M second print label images represented by the M pieces of the second print data, a different first text among the M first texts is written in the second object area.

7. The non-transitory computer-readable recording medium as in claim 6, wherein the M first texts are included in a single database file.

8. The non-transitory computer-readable recording medium as in claim 1, wherein the computer-readable instructions, when executed by the processor, further cause the terminal device to:

in the case where the print instruction is acquired under the state where the first instruction information and the second instruction information are stored in the memory, display an inputting screen for inputting the first text on a display unit of the terminal device.

9. A terminal device comprising:

a controller; and a memory, wherein the controller is configured to:

in a case where a first template including a first object area exists and a predetermined instruction is given on the first object area, store first instruction information which indicates that the predetermined instruction has been given on the first object area in the memory;

in a case where a second template including a second object area exists and the predetermined instruction is given on the second object area, store second instruction information which indicates that the predetermined instruction has been given on the second object area in the memory, the second template being different from the first template;

in a case where a print instruction is acquired under a state where the first instruction information and the second instruction information are stored in the memory, create first print data by using the first template including the first object area indicated by the first instruction information, wherein the first print data is for causing a label printer to create a single label, and the first print data represents a first print label image in which a first text designated by a user is written in the first object area;

in the case where the print instruction is acquired under the state where the first instruction information and the second instruction information are stored in the memory, create second print data by using the second template including the second object area indicated by the second instruction information, wherein the second print data is for causing the label printer to create a single label, and the second print data represents a second print label image in which the first text is written in the second object area; and send the first print data and the second print data to the label printer.

10. A method executed by a terminal device, the method comprising:

in a case where a first template including a first object area exists and a predetermined instruction is given on the first object area, store first instruction information which indicates that the predetermined instruction has been given on the first object area in a memory of the terminal device;

in a case where a second template including a second object area exists and the predetermined instruction is given on the second object area, store second instruction information which indicates that the predetermined instruction has been given on the second object area in the memory, the second template being different from the first template;

in a case where a print instruction is acquired under a state where the first instruction information and the second instruction information are stored in the memory, create first print data by using the first template including the first object area indicated by the first instruction information, wherein the first print data is for causing a label printer to create a single label, and the first print data represents a first print label image in which a first text designated by a user is written in the first object area;

in the case where the print instruction is acquired under the state where the first instruction information and the second instruction information are stored in the memory, create second print data by using the second template including the second object area indicated by the second instruction information, wherein the second print data is for causing the label printer to create a single label, and the second print data represents a second print label image in which the first text is written in the second object area; and send the first print data and the second print data to the label printer.

* * * * *